United States Patent [19]

Carpenter et al.

[11] Patent Number: 5,139,297
[45] Date of Patent: Aug. 18, 1992

[54] INTERNAL STROKING BUMPER BEAM

[75] Inventors: Ronald A. Carpenter, Dearborn; Jau-Ching L. Leu, Southfield, both of Mich.

[73] Assignee: Ford Motor Company, Dearborn, Mich.

[21] Appl. No.: 758,134

[22] Filed: Sep. 12, 1991

[51] Int. Cl.⁵ .............................................. B60R 19/26
[52] U.S. Cl. .................................. 293/132; 293/109; 293/136
[58] Field of Search ................. 293/109, 136, 135, 132

[56] References Cited

U.S. PATENT DOCUMENTS

| | | |
|---|---|---|
| 1,348,030 | 7/1920 | Millard . |
| 3,574,379 | 4/1971 | Jordan . |
| 3,734,554 | 5/1973 | Schwabenlender ............ 293/136 X |
| 3,739,882 | 6/1973 | Schwenk et al. ............... 293/136 X |
| 4,061,385 | 12/1977 | Schwartzberg . |
| 4,082,338 | 4/1978 | Hutai et al. ............................ 293/136 |
| 4,085,956 | 4/1978 | Weisshappel et al. ............... 293/136 |
| 4,460,205 | 7/1984 | Glance . |
| 4,474,395 | 10/1984 | Harloff et al. . |
| 4,542,925 | 9/1985 | Huber et al. . |
| 4,569,865 | 2/1986 | Placek . |
| 4,762,352 | 8/1988 | Enomoto . |
| 4,940,270 | 7/1990 | Yamazaki et al. ............... 293/132 X |

FOREIGN PATENT DOCUMENTS

| | | |
|---|---|---|
| 3215601 | 1/1983 | Fed. Rep. of Germany ...... 293/132 |
| 2178007 | 7/1990 | Japan .................................... 293/109 |

Primary Examiner—Margaret A. Focarino
Assistant Examiner—Gary C. Hoge
Attorney, Agent, or Firm—Roger L. May; Daniel M. Stock

[57] ABSTRACT

A bumper structure, for use with an internal frame structure of a vehicle which has a pair of longitudinally extending generally parallel rail members and a cross-beam member attached to and extending transversely of the rail members, including a face bar member which slidingly receives the cross-beam member and provides a cavity between the two members. Energy absorbing material resides within the cavity. Should the frontal portion of the face bar receive an impact load above a predetermined magnitude, the face bar will slide rearward toward the cross-bar member thereby compressing the energy absorbing material and absorbing the impact. Various alternative constructions are included which additionally preclude relative lateral movement of the bumper structure during compression of the bumper beam relative to the frame member, including providing the face bar member with a back-up plate rearward of the cross-beam member and which straddles the respective axially extending rail members.

18 Claims, 3 Drawing Sheets

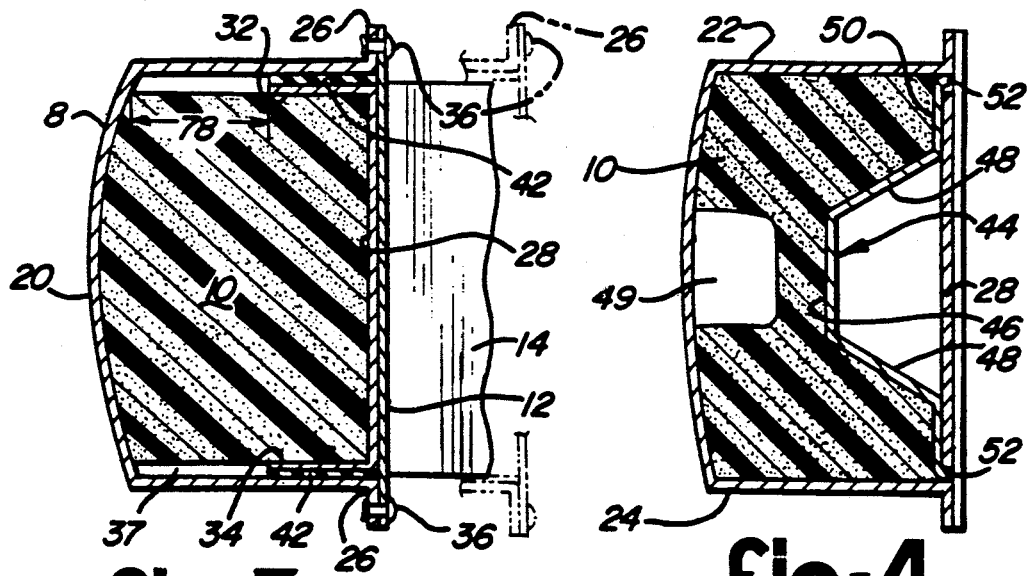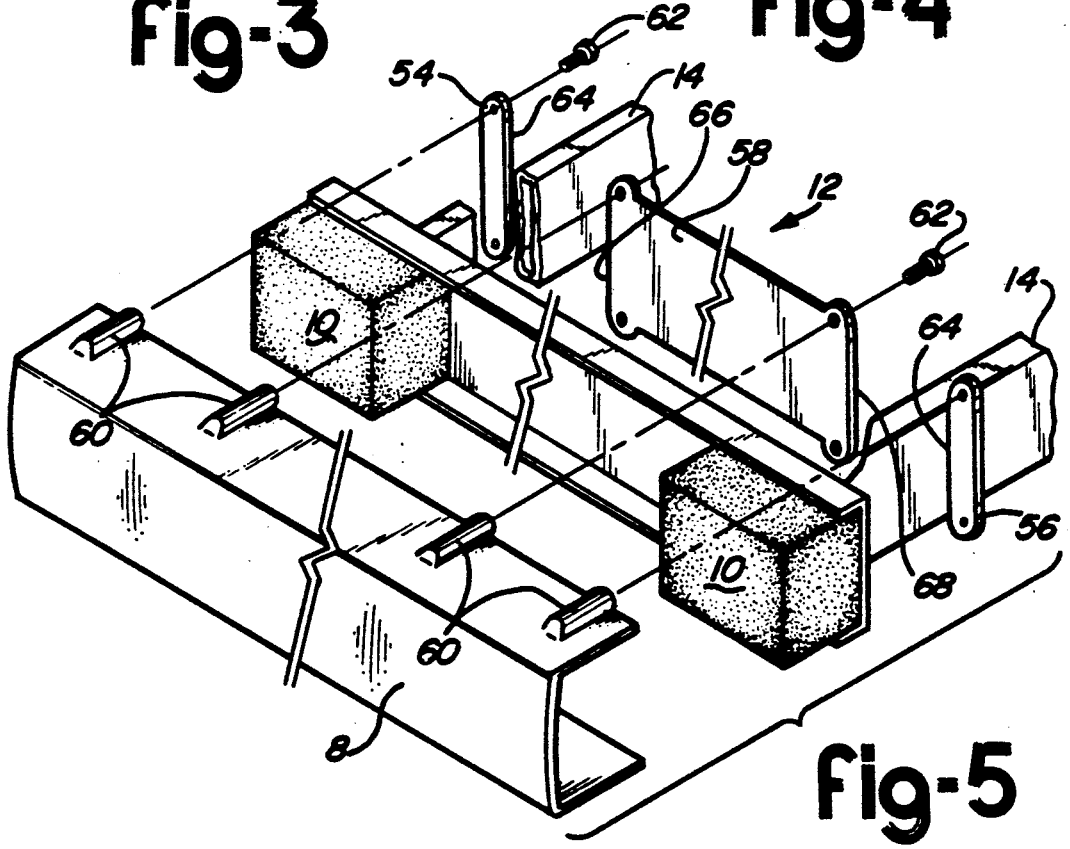

INTERNAL STROKING BUMPER BEAM

TECHNICAL FIELD

This invention relates to vehicle bumpers, particularly energy absorbing vehicle bumper structures for cushioning low speed impact.

BACKGROUND ART

In recent years, much attention has been paid to developing energy absorbing front and rear vehicle bumper structures to absorb low speed direct frontal collisions, i.e. in the order of one to five mile per hour. These bumper systems are generally supplemental to other passenger restraint systems such as seatbelts and steering column mounted expandable air bags, with the air bag systems being primarily active for the higher speed impacts exceeding the one to five mile per hour range.

The typical low impact energy absorbing bumper system in popular use is the "soft" bumper system. This generally includes a flexible synthetic resin front bumper plate enclosing an energy absorbing type foam material, all of which may be mounted on a fairly rigid back plate or cross member extending transversely of the vehicle and mounted at its ends to axially extending vehicle frame members. Such a cross member is usually made of steel and is in effect the rigid chromed steel bumper which was so popular in the past. Typical of these soft bumper systems are those shown in U.S. Pat. Nos. 3,574,379, 4,542,925, 4,569,865 and 4,762,352.

Additionally, it is known to provide a fairly rigid bumper system with axially directed shock absorber members located intermediate the bumper structure and the vehicle frame to allow the entire bumper structure to yield upon receiving a relatively low energy impact and the return to its initial position upon cessation of the impact load.

Finally, internal stroking type bumper beam constructions are known wherein a fairly rigid front bumper plate member is retained on a face plate or similar member located at opposite ends of the bumper beam in such a manner that the front bumper beam can slide rearward toward the face plate upon receiving a frontal impact. An energy absorbing material is located between the front bumper beam and face plate to absorb the energy of the impact and return the front bumper beam to its original position upon cessation of the impact. Such a system has been proposed as an add-on to the vehicle frame members, as shown in U.S. Pat. No. 4,460,205.

Despite the foregoing developments, there exists the need for an energy absorbing vehicle bumper system which is designed as an integral part of the vehicle frame structure, is simple in construction with a minimal number of component parts, provides in the unloaded condition a bumper structure having minimal length in the fore-aft axis of the vehicle, and is of minimal weight yet capable of resiliently absorbing a maximum amount of impact energy per unit stroke.

SUMMARY OF THE INVENTION

The present invention contemplates a vehicular energy absorbing bumper system capable of absorbing a significant amount of energy at low speed impact and returning to its original non-impacted condition.

The present invention also contemplates a vehicular energy absorbing bumper system integrally designed with the vehicle frame structure to thereby provide a bumper system of high strength, minimum components, low weight, and a minimum fore and aft dimension.

The present invention further contemplates a vehicular energy absorbing bumper system including an energy absorbing foam material positioned intermediate a relatively rigid front bumper beam and a rearward relatively rigid face plate or cross member integral with the vehicle frame structure whereby the front bumper beam can axially collapse relative to the rear cross member to thereby depress the energy absorbing foam material to absorb the impact of any low speed collision.

The present invention further contemplates the aforementioned internally stroking bumper beam assembly which further includes means for absorbing a collision force directed at any acute angle to the front bumper beam and for absorbing the transverse load component of any such impact within the vehicle frame structure, thereby minimizing shear forces on the energy absorbing foam material as well as holding the transverse location of the front bumper beam relative to the rear cross member.

Additionally, the present invention contemplates a unified vehicle chassis frame structure and bumper structure wherein (i) the frame structure includes a pair of longitudinally extending generally parallel rail members, each having a distal end, and a channel member secured to and extending traversely between each of the distal ends, and (ii) the bumper structure is disposed transversely of the rail members and includes a bumper beam, an energy absorbing material member, and an attachment member for securing the bumper structure to the frame structure. The bumper structure is capable of sliding fore and aft relative to the frame structure. The bumper beam and frame member cooperate to define a cavity within which is disposed the energy absorbing material member. An impact load upon the bumper beam in any rearward direction toward the longitudinal axis of the rail members will cause the front portion of the bumper beam to slide toward the frame member thereby compressing the energy absorbing material and dissipating the impact load over the entire length of the bumper beam and frame member.

In an alternate embodiment, the attachment member of the bumper structure is a backing plate member disposed rearward of the traversely extending channel member in encapsulating relationship with the rail members to preclude relative lateral movement of the bumper structure during fore and aft stroking movement of the bumper beam during impact and immediately following impact upon cessation of any impact load.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a cross-sectional view of the bumper structure in accordance with the present invention as taken along the section line 3—3 of FIG. 1;

FIG. 4 is a cross-sectional view of the bumper structure in accordance with a second embodiment of the present invention (taken at the same place as section lines 3—3 of FIG. 1);

FIG. 5 is an exploded perspective view, similar to that of FIG. 2, and showing a third embodiment of the present invention;

BEST MODE FOR CARRYING OUT THE INVENTION

Figure 1:
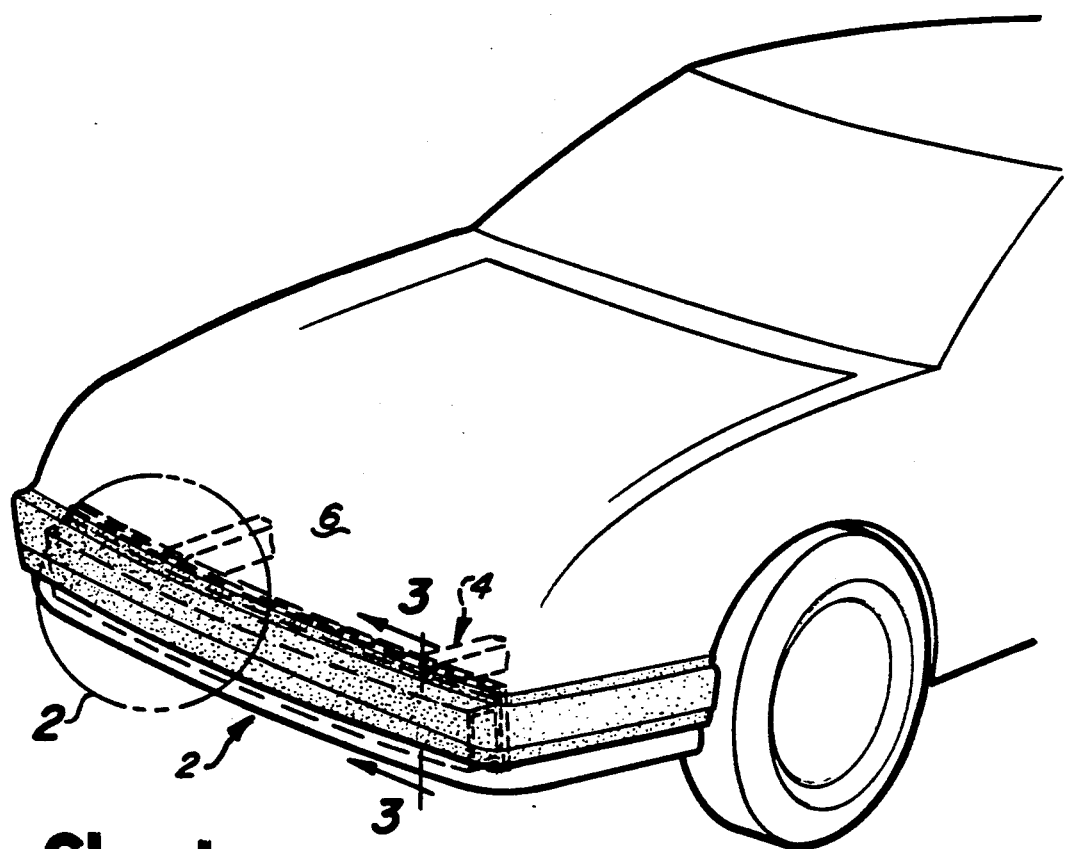
FIG. 1 is a general perspective view of the front end (or rear end) of a vehicle and showing in hidden lines the general outline of the present invention.

Referring to the drawings, FIG. 1 is a general view of the bumper assembly 2 mounted to the vehicle frame 4 at the front of the vehicle 6 As shown, the bumper assembly 2 is covered by a soft flexible plastic material forming the ornamental front end of the vehicle. The bumper assembly could also be exposed. Further, for purposes of the invention, the bumper assembly could be mounted at the front or rear of the vehicle.

Figure 2:
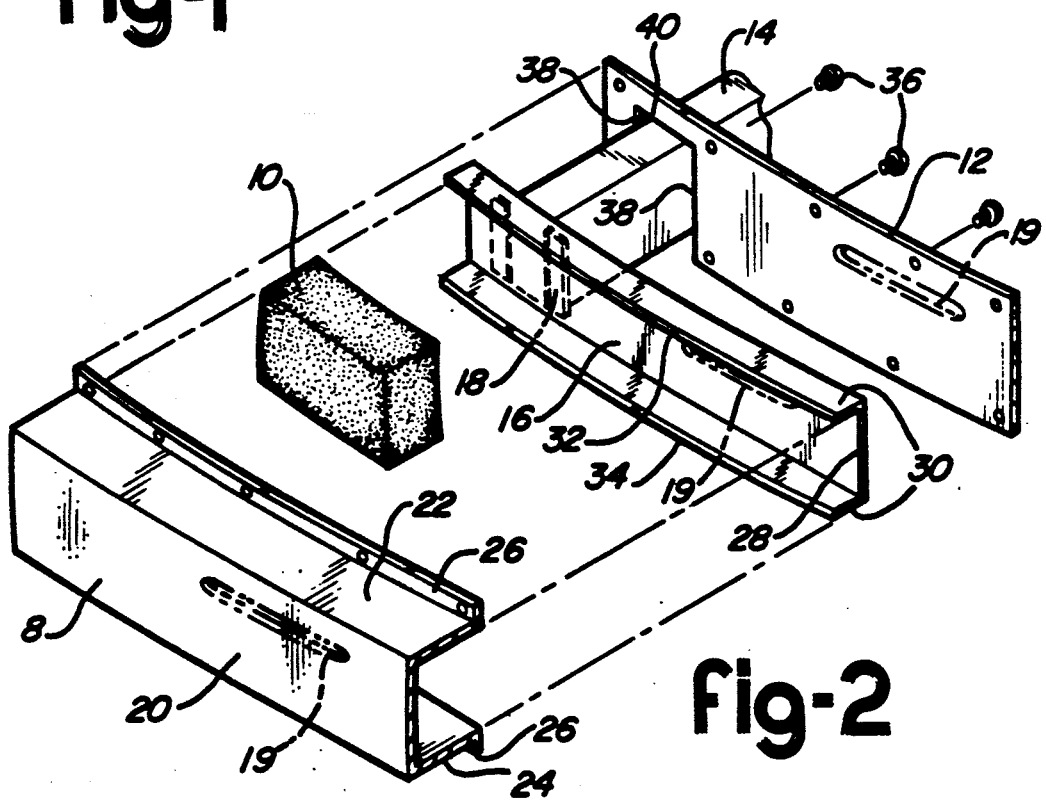
FIG. 2 is an exploded perspective view of a portion of the bumper structure of the present invention taken from the encircled area shown in phantom line and designated 2 in FIG. 1.

A first embodiment of the present invention is shown in detail in FIGS. 2 and 3 wherein it is to be noted that the bumper assembly includes three basic components, namely a face bar 8, a block of foamed energy absorbing material 10 and back plate 12. The bumper assembly 2 is mounted on a frame structure comprising a pair of parallel frame rail members 14 (only one of which is shown in FIG. 2) and a transversely extending cross-beam 16 which is welded or otherwise permanently fixed to the respective ends of the frame rails 14 as generally shown at 18.

These basic components are fairly rigid and made of high strength materials such that the low impact loads designed to be absorbed by the assembly will not cause permanent deformation of any of its members. For example, a suitable design would include a cross-beam member 16 of approximately 2 millimeters thickness, a face bar 8 of approximately 2¼ millimeters thickness made of steel, and a steel back plate 12 of approximately 1.5 millimeters thickness. Any of the components, but particularly the face bar 8, could also be made of a structural composite material, such as a resin composite, particularly glass reinforced plastic.

Suitable materials for the foamed energy absorbing block 10 include most any polypropylene or urethane foam, and others such as elastomeric honeycomb. As shown in FIG. 2, the foamed energy absorbing material can be two separate blocks of material located at the respective ends of the cross-beam in alignment with the rail members 14, or it can be a single block of material extending the entire length of the cross-beam 16. Where separate blocks 10 are used, the space between the blocks allows for the possibility of providing aligned slots 19 (shown in dotted line) through each of the face bar 8, cross-beam member 16 and back plate 12 to allow increased air intake to the conventional radiator placed on the rearward side of the back plate 12, thus increasing the cooling capacity of the vehicle.

The face bar 8 is a channel member, being basically C-shaped in cross-section, and including a front wall 20 and side walls 22,24. Each of the side walls 22,24 includes an outwardly turned flange 26.

The cross-beam member 16 is also a channel member of basic C-shaped cross-section. It includes a vertical base wall 28 and opposed side walls 30 which form upper and lower flanges 32,34, respectively.

As seen in FIG. 3, the face bar and cross-member are sized such that the cross-beam member is nested completely within the cavity formed by the face bar 8. The back plate member 12 is mounted over the frame rail members 14 at the rearward side of the cross-beam member and is affixed to the face bar flanges 26 by any suitable means such as the rivets 36 shown. The foamed energy absorbing block 10 nearly completely fills the cavity 37 formed between the face bar 8 and cross-beam member 16. Preferably, it is sized such that it completely fills the space between the upper and lower flanges 32,34 of the cross-beam member and can be held in place during assembly by being under slight compression between the two flanges. Alternatively, it can be bonded to either or both of the face bar 8 and cross-beam member 16. Preferably, in its assembled position as shown in FIG. 3, the foamed material will be under slight compression between the face bar and cross-beam so that the back plate will be held firmly against the cross-beam member 16.

Further, it is desirable to place a strip or layer of low friction, vibration damping material 42 between the interfaces of the upper and lower flanges with the side walls of the face bar and between the vertical base wall 28 of the cross-beam member and the back plate 12.

From FIG. 2, it will be noted that the back plate 12 includes a rectangularly-shaped cut-out section defined by a pair of side walls 38 and a third wall 40 which allow the back plate to be mounted over the frame rail 14. The depth of the cut-out section is somewhat immaterial, however, it is important for reasons explained more fully below that the side walls 38 extend the full depth of the frame rail 14 and be positioned in close proximity to the frame rail.

In operation, when the face bar is impacted during a collision at relatively low speed, i.e. from 1–5 miles per hour, the face bar will slide rearward toward the cross-beam member putting the energy absorbing material member 10 in compression and thereby absorbing the impact load. The energy absorbed will increase with the stroke of the face bar member relative to the cross-beam. When the impact load is absorbed or withdrawn, the face bar will return to its original position. The low friction, vibration damping material strips 42 disposed between the relative sliding surfaces of the cross-beam member and face bar assist in the reciprocal sliding action between these two members. Also, if the impact load is taken at an angle other than normal to the face bar, there will be transverse or lateral component forces which, unless positively restrained, would tend to cause the face bars positioned to shift laterally relative to the cross-beam. Any such transverse slippage is precluded by the walls 38 of the back plate member which act as a guide to assure that the sliding action of the bumper assembly is solely along an axis coincident with the longitudinal axis of the frame rail members 14. Any significant lateral force will cause one side wall 38 or the other to abut each respective frame rail member 14.

This positively precludes any shifting of the face bar member 8 relative to the cross-beam member 16.

A further embodiment of the present invention is shown in FIG. 4 wherein the only notable change is that in the design of the cross-beam member 16. The cross-beam 16 is constructed as a hollow composite member comprising a vertical base wall 28 to which is welded or otherwise secured a channel reinforcement member 44, which is basically C-shaped in cross-section as shown in FIG. 4, the reinforcement member 44 includes a front wall 46, side walls 48 which diverge outwardly from the front wall and terminate in respective flange portions 50 which are welded or otherwise affixed to the vertical base wall. The composite cross-beam member includes upper and lower edges 52 which may be in contact with or in close proximity to the internal surfaces of the face bar side walls 22,24 to provide the means for supporting the face bar on the cross-beam member. The cavity between the face bar and cross-beam member is completely filled with foamed energy absorbing material, which in conjunction with the generally trapezoidal cross-sectional shape of the reinforcement member 44 acts to assist in supporting the face bar on the cross-beam member. If desired, the foamed energy absorbing material may include a series of cavities 49 to adjust the compressional characteristics of the foam material to the design requirements of the bumper assembly.

It will further be noted in FIG. 3 from the representation shown in dotted line, that the face bar can slide relative to the cross-beam member a maximum designed distance 78, at which point the foamed energy absorbing block 10 will be under full compression. The bumper may be constructed such that the front edge of cross-beam flanges 32 and 34 will, after traversing the distance 78, contact the backside of face bar front wall 20 either directly or indirectly through the fully compressed and expanded energy absorbing block 10.

Figure 6:
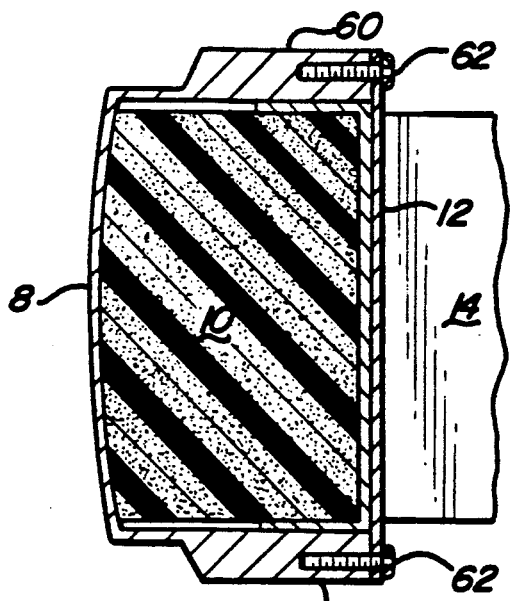
FIG. 6 is a cross-sectional view of the bumper structure in accordance with the present invention as shown in FIG. 5 (taken at the same place as section lines 3—3 of FIG. 1)

FIGS. 5 and 6 show yet another alternative embodiment of the present invention wherein the back plate member 12 is comprised of three separate plate members 54, 56, 58. Each may be secured to the face bar member 8 in the manner described above. Alternatively, the side walls 22,24 of the face bar may include four raised and internally threaded bosses 60 adapted to receive bolts 62 inserted through the vesting holes of each respective back plate member 54, 56, 58. The outboard back plate members 54,56 each include an inward shoulder 64 in close proximity to the respective outer wall of each rail member 14 and act as guide bars for guiding the reciprocation of the bumper assembly in the direction of the rail members and absorbing at a lateral force placed upon the bumper assembly. Likewise, the outboard faces 66,68 of the central back plate unit 58 serve the same function.

Figure 8:
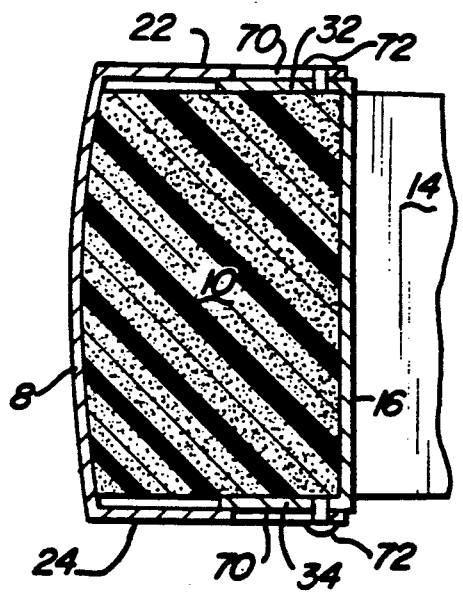
FIG. 8 is a cross-sectional view of the bumper structure in accordance with the present invention as shown in FIG. 7 (taken at the same place as section lines 3—3 of FIG. 1).
Figure 7:
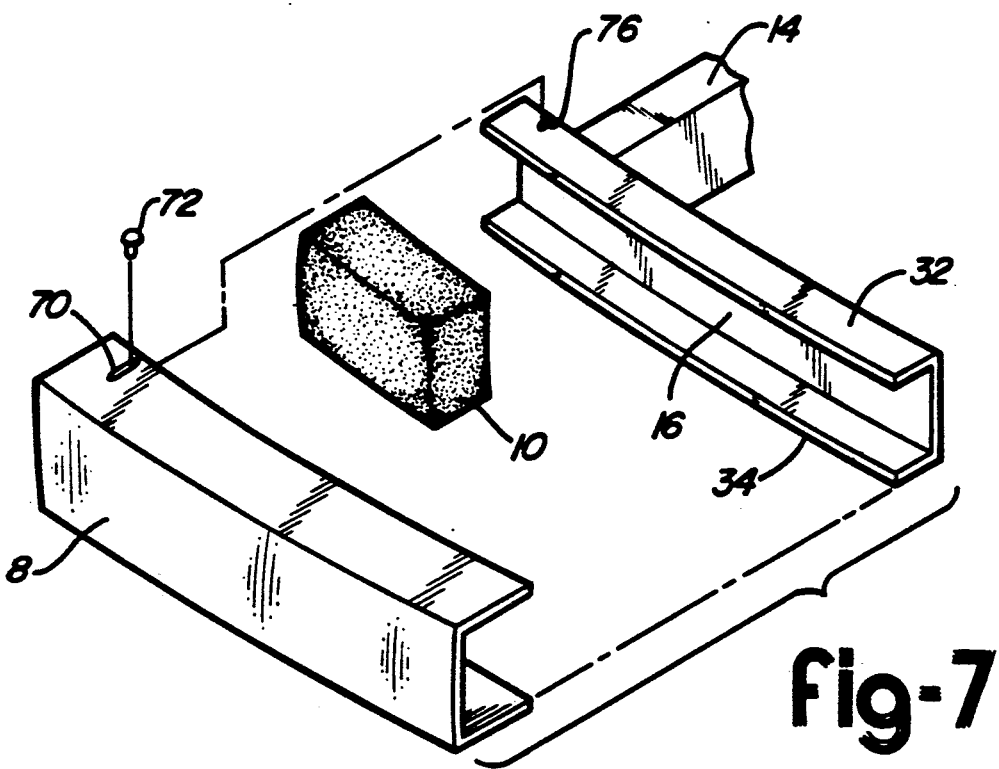
FIG. 7 is an exploded perspective view, similar to that of FIG. 2, and showing a fourth embodiment of the present invention.

Another embodiment of the present invention is shown in FIGS. 7 and 8. The previous embodiments each included a back plate member and could be referred to as a closed face bar assembly. The embodiment shown in FIGS. 7 and 8 can be referred to as an open face bar since no back plate member is included. The face bar member 8 includes at each end a slot 70 closed at each end and longitudinally directed in the direction of the frame rail member 14 and having a length at least slightly greater than the internal stroke designed into the bumper assembly. A pin 72 passes through the slot and is affixed to the upper flange 32 of cross-beam member 16 at locating point 76. A similar fastening arrangement can be provided on the opposing side wall of the face bar and elsewhere throughout the length of the face bar member. The pin and slot arrangement serves the function of attaching the bumper assembly components to one another as well as providing a means for guiding the stroke of the face bar in a direction parallel to the rail members and at the same time having limited capability of absorbing any lateral load placed upon the bumper assembly and thereby preventing shifting of the face bar member relative to the cross-beam member.

Although particular embodiments of the present invention have been illustrated in the accompanying drawings and described in the foregoing detailed description, it is to be understood that the present invention is not to be limited to just the embodiments disclosed. Numerous rearrangements, modifications and substitutions are possible without departing from the scope of the claims hereafter.

We claim:

1. In combination, a vehicle chassis frame structure and a bumper structure;

the frame structure including a pair of longitudinally extending generally parallel rail members, each having a distal end, and a substantially rigid, stationary cross-beam means abuttingly secured to and extending transversely of each of the distal ends;

the bumper structure being oriented generally transversely of the rail members and including a substantially rigid face bar member, an energy absorbing member, and attachment means for securing the face bar member to the cross-beam means in a manner allowing the face bar member to slide toward the cross-beam means on a slide axis substantially parallel to said rail members;

the face bar member having a frontal portion for receiving an impact load;

the face bar member and cross-beam means cooperating to define a cavity between them;

the energy absorbing member residing within the cavity and being captured between the cross-beam means and the bumper structure;

wherein an impact load upon the face bar member in a direction toward the longitudinal axis of the rail members will cause the front portion of the face bar member to slide relative to the cross-beam means without deformation thereby compressing the energy absorbing member over substantially the entire length of the face bar member and thus dissipating the impact load over the length of the cross-beam means and to the frame structure.

2. The combination of claim 1 wherein the attachment means includes means for precluding relative lateral movement between the bumper structure and the frame structure during movement of the bumper structure axially relative to the frame member.

3. The combination of claim 1 wherein said face bar member, said cross-beam means and said rail members are of substantially equal strength materials.

4. The combination of claim 3 wherein said cross-beam means is a single cross-beam member extending from one said rail member to the other said rail member.

5. The combination of claim 4 wherein said cross-beam means is a C-shaped cross-beam member having a vertical base wall and upper and lower flanges extending forwardly in the direction of said face bar member, said face bar member being C-shaped and having a vertical face wall and upper and lower flanges extending rearwardly from said face wall in the direction of said cross-beam member;

said cross-beam member being nested within said face bar member in sliding relationship such that the upper and lower flanges of said cross-beam member slidingly support said face bar member at all times.

6. The combination of claim 4 wherein the cross-beam member in cross-section taken in a plane extending parallel to said rail members and normal to said cross-beam member is hollow and trapezoidal in shape;

said cross-beam member including a vertical base wall having upper and lower edges extending the length thereof;

said cross-beam member further including a longitudinally extending, C-shaped reinforcement member affixed to said base wall to define the outermost boundaries of said trapezoidally-shaped cross-beam member;

said reinforcement member including a front wall portion constituting a stop means for terminating the relative sliding of the face bar member toward said cross-beam member.

7. The combination of claim 4 wherein said energy absorbing member is a foamed synthetic polymer.

8. The combination of claim 7 wherein said energy absorbing member is a foamed polypropylene material.

9. The combination of claim 7 wherein the energy absorbing member is a foamed urethane material.

10. The combination of claim 5 wherein said energy absorbing member includes first and second blocks of foamed synthetic polymer material transversely spaced from one another and located at respective distal ends of said rail members.

11. The combination of claim 1 wherein said attachment means includes a back plate member on the rearward side of said cross-beam means opposite said face bar member;

said back plate member being secured to said face bar member and including guide means for (i) precluding lateral displacement of said face bar member relative to said rail members and (ii) guiding said face bar along a slide path parallel to said rail members.

12. The combination of claim 11 wherein said guide means includes said back plate member having a vertically extending guide bar portion in near abutting engagement with the respective parallel rail members of the frame structure.

13. The combination of claim 12 wherein said rail members each include a laterally outwardly disposed rail and a laterally inwardly disposed rail;

the guide bar portions of said back plate member being in near abutting engagement with the respective rail members at both the inwardly disposed rails and outwardly disposed rails.

14. The combination of claim 13 wherein the guide bar portions of said back plate member include a plurality of independent units secured to the face bar member to preclude relative lateral movement of the bumper structure relative to the frame structure.

15. A bumper structure for use with an internal frame structure of a vehicle having a pair of longitudinally extending generally parallel rail members, each having a distal end, the bumper structure comprising:

a face bar member having a frontal portion for receiving an impact load;

a frame member having an attachment means for attaching the bumper structure to the distal end of the rail members;

the face bar member and the frame member cooperating to define a cavity;

an energy absorbing material residing within the cavity and being captured between the face bar member and the frame member;

a back plate member in encapsulating relationship with the rail members precluding relative lateral movement of the bumper structure during axial movement of the face bar member relative to the frame member; and said guide means including said back plate member having a vertically extending guide bar portion in near abutting engagement with the respective parallel rail members of the frame structure.

16. The bumper structure of claim 15 wherein said energy absorbing member includes first and second blocks of foamed synthetic polymer material transversely spaced from one another and located at respective distal ends of said rail members.

17. The bumper structure of claim 15 wherein the guide bar portion of said back plate member includes a plurality of independent units secured to the face bar member to preclude relative lateral movement of the bumper structure relative to the frame structure.

18. The bumper structure of claim 17 wherein said energy absorbing member includes first and second blocks of foamed synthetic polymer material transversely spaced from one another and located at respective distal ends of said rail members.

* * * * *